US008125886B2

(12) United States Patent
Yang et al.

(10) Patent No.: US 8,125,886 B2
(45) Date of Patent: Feb. 28, 2012

(54) SYSTEM, APPARATUS, AND METHOD FOR SPATIAL MULTIPLEXING WITH SYMBOL SPREADING

(75) Inventors: Jun Yang, Croton-On-Hudson, NY (US); Monisha Ghosh, Chappaqua, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 144 days.

(21) Appl. No.: 12/096,435

(22) PCT Filed: Dec. 5, 2006

(86) PCT No.: PCT/IB2006/054613
§ 371 (c)(1),
(2), (4) Date: Jun. 6, 2008

(87) PCT Pub. No.: WO2007/066291
PCT Pub. Date: Jun. 14, 2007

(65) Prior Publication Data
US 2008/0285434 A1 Nov. 20, 2008

Related U.S. Application Data

(60) Provisional application No. 60/748,676, filed on Dec. 8, 2005.

(51) Int. Cl.
*H04J 11/00* (2006.01)
(52) U.S. Cl. ........ 370/208; 370/204; 370/335; 370/329; 375/298; 375/267; 375/148; 375/347
(58) Field of Classification Search .................. 370/203, 370/208, 335; 375/148, 141, 150
See application file for complete search history.

(56) References Cited

U.S. PATENT DOCUMENTS

| 7,349,496 | B2* | 3/2008 | Jia et al. ........................ 375/341 |
| 7,519,022 | B2* | 4/2009 | Yu et al. ........................ 370/329 |
| 7,583,747 | B1* | 9/2009 | Damen et al. .................. 375/267 |
| 2003/0235147 | A1* | 12/2003 | Walton et al. .................. 370/204 |
| 2005/0053169 | A1 | 3/2005 | Jia |
| 2005/0078761 | A1* | 4/2005 | Hottinen et al. ............... 375/267 |

(Continued)

FOREIGN PATENT DOCUMENTS

WO WO2005060192 A1 6/2005

OTHER PUBLICATIONS

Soo Ki Choi et al., Rotated Multidimensional Modulation for Spatial Multiplexing Systems, Vehicular Technology Conference, 2003, VTC, 2003—Fall, IEEE 58th Orlando, FL, pp. 246-250, vol. 1, XP010700969.

(Continued)

*Primary Examiner* — Ricky Ngo
*Assistant Examiner* — Rasheed Gidado
(74) *Attorney, Agent, or Firm* — Larry Liberchuk

(57) ABSTRACT

The present invention provides a system (400), device (200, 300), and method (200) for a spatial multiplexing (SMX) transmission scheme combined with symbol spreading and rotation using a pre-determined matrix R, which can greatly improve system performance without requiring additional bandwidth or power consumption under fast Rayleigh flat fading channels or high frequency-selective channels in UWB systems. Because of the lattice-based structure, sphere decoding is employed to reduce the complexity of ML decoding while maintaining the near ML performance. On the other hand, ZF and MMSE receivers can also be used due to the systematic structure at the transmitter.

34 Claims, 2 Drawing Sheets

U.S. PATENT DOCUMENTS

| | | | |
|---|---|---|---|
| 2005/0180312 A1* | 8/2005 | Walton et al. | 370/208 |
| 2005/0190849 A1* | 9/2005 | McNamara | 375/267 |
| 2005/0226313 A1* | 10/2005 | Castelain et al. | 375/146 |
| 2006/0013250 A1* | 1/2006 | Howard et al. | 370/465 |
| 2006/0256843 A1* | 11/2006 | Grant et al. | 375/148 |
| 2006/0268165 A1* | 11/2006 | van Nee | 348/388.1 |
| 2006/0280229 A1* | 12/2006 | Kim et al. | 375/144 |
| 2007/0275668 A1* | 11/2007 | Gresset et al. | 455/69 |

OTHER PUBLICATIONS

E.G. Larson, "Improving the frame-Error-Rate of Spatial Multiplexing in Block Fading by Randomly Rotating the Signal Constellation", IEEE Communications Letter, IEEE Service Venter, Piscataway, NJ, vol. 8, No. 8, Aug. 2004, pp. 514-516, XP011117230.

W. Bai et al., A Full Diversity Full Rate 4-Antenna Alamouti Code, Personal, Indoor and Mobile radio Communications, 2005, PIMRC 2005, IEEE 16th International Symposium on Berlin, Germany, Sep. 2005, pp. 72-76, XO010926451.

J. Akhtar et al., Spatial Multiplexing Over Correlated MIMO Channels with a Closed-Form Precoder, IEEE Transactions on Wireless Communication, Sep. 2005,pp. 2400-2409, XP002435311.

J. Boutros et al., "Signal Space Diversity: A Power-and-Bandwidth-Efficient Diversity Technique for the Rayleigh Fading Channel", IEEE Transaction Infomation Theory, vol. 44, pp. 1453-1467, Jul. 1998.

Wei Zhang et al., "Rate Two Full-Diversity Space-Frequency Code Design for MIMO-OFDM", Signal Processing Advances in Wireless Communications, 2005 IEEE 6th Workshop Jun. 2005, pp. 303-307.

H. Vikalo et al., Maximum-Likelihood Sequence Detection of Multiple Antenna Systems over Dispersive Channels Via Shere Decoding, EUROSIP Journal of Applied Signla processing 2002:5, pp. 525-531.

\* cited by examiner

SYSTEM, APPARATUS, AND METHOD FOR SPATIAL MULTIPLEXING WITH SYMBOL SPREADING

The present invention relates to a system, apparatus, and method for spatial multiplexing with symbol spreading rotation that achieves higher order diversity in a MIMO system while maintaining spectral efficiency.

In next generation wireless communication systems, the spatially multiplexing (SMX) (or MIMO) is of particular interest since it can exploit the richly scattered channel environment by using multiple transmit and receive antennas. Meanwhile, it can provide significant improvements in spectrum efficiency.

Diversity is commonly used in wireless communication systems to improve system performance. Although spatially multiplexing is able to achieve high spectrum efficiency, the number of receiver antennas must be increased to retain the high diversity order.

Since it is not practical to implement this type of system having, a different type of diversity to improve the performance of SMX systems is needed.

The system, apparatus and method of the present invention provide a technique to achieve more diversity with SMX using a symbol-spreading rotation can be considered as a potential solution based on signal space diversity. The optimal rotations for a single antenna system of a preferred embodiment provide full modulation diversity while maximizing the minimum product distance, see J. Boutros and E. Viterbo, "Signal space diversity: a power- and bandwidth-efficient diversity technique for the Rayleigh fading channel," IEEE Trans. Information Theory, Vol. 44, pp. 1453-1467, July 1998. For a QAM constellation, real rotation matrices are combined with SMX systems to increase its diversity order while maintaining the relatively low computational complexity.

Figure 1:
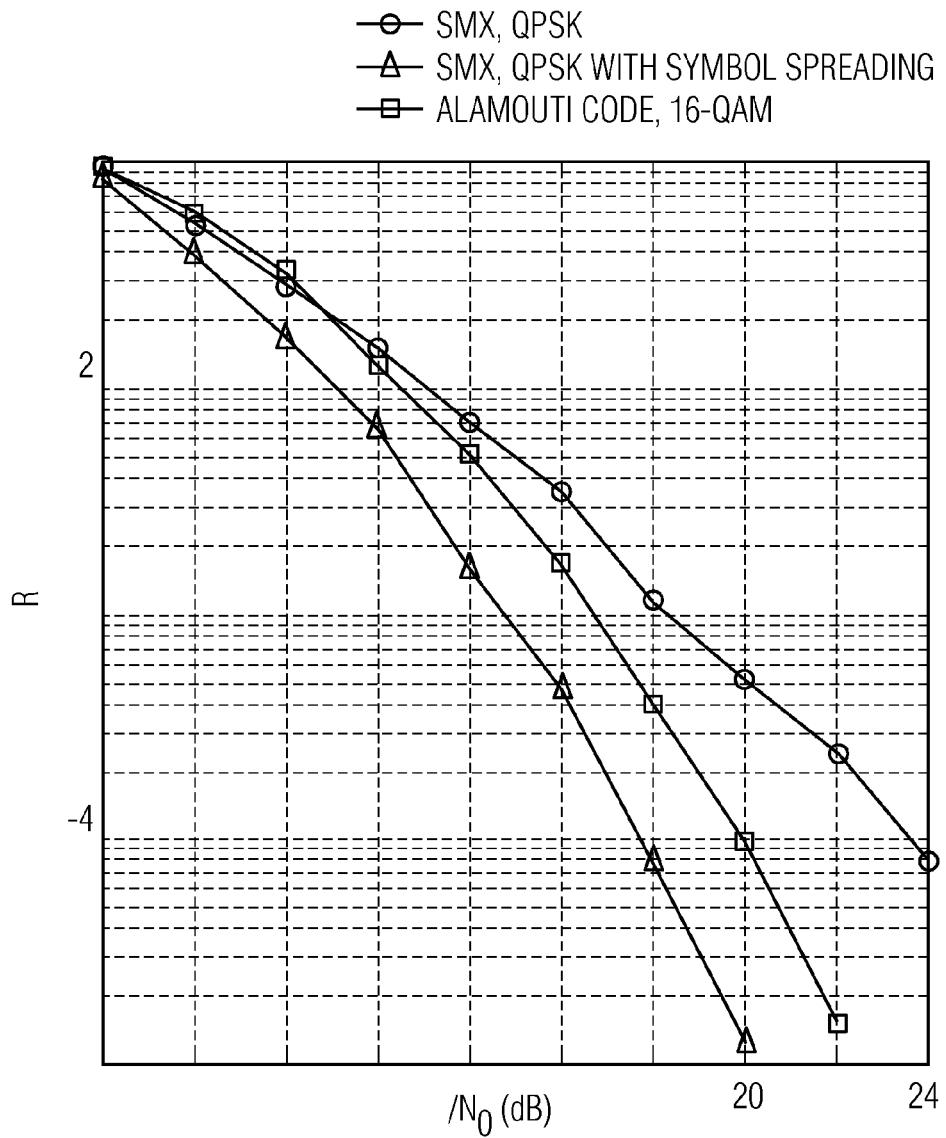
FIG. 1 illustrates the performance improved of the present invention.

It is to be understood by persons of ordinary skill in the art that the following descriptions are provided for purposes of illustration and not for limitation. An artisan understands that there are many variations that lie within the spirit of the invention and the scope of the appended claims. Unnecessary detail of known functions and structure may be omitted from the current descriptions so as not to obscure the present invention.

A preferred embodiment applies to multiple-input multiple-output (MIMO) single-carrier systems over fast Rayleigh flat fading channels. In an alternative preferred embodiment, the same system is viewed as a MIMO multi-carrier system whose coherent bandwidth is much less than the channel bandwidth, such as an OFDM-UWB system. The system has M transmitter antennas and N receiver antennas. The N×M channel matrix is denoted by $H_t$, where t is the time instant for a fast fading case or the sub-carrier index for an OFDM case.

Define the transmitted symbol vector $x_t$, the received symbol vector $y_t$, the noise vector $n_t$ and the N×M channel matrix $H_t$, respectively, as follows:

$$x_t = \begin{bmatrix} x_{t1} \\ x_{t2} \\ \vdots \\ x_{tM} \end{bmatrix}, y_t = \begin{bmatrix} y_{t1} \\ y_{t2} \\ \vdots \\ y_{tN} \end{bmatrix}, n_t = \begin{bmatrix} n_{t1} \\ n_{t2} \\ \vdots \\ n_{tN} \end{bmatrix}$$

and $$H_t = \begin{bmatrix} h^t_{11} & h^t_{12} & \ldots & h^t_{1M} \\ h^t_{21} & h^t_{21} & \ldots & h^t_{2M} \\ \vdots & \vdots & \ddots & \vdots \\ h^t_{N1} & h^t_{N2} & \ldots & h^t_{NM} \end{bmatrix}.$$

Then the general SMX system model can be described as $$y_t = H_t x_t + n_t, t=1, 2, \ldots T.$$

where T is the number of blocks or the number of sub-carriers. The goal is providing certain diversity by combining these T consecutive symbol vectors. The larger T means the higher diversity order. A T×T spreading rotation matrix R is applied to these T consecutive original symbol vectors such that $$s_t = \begin{bmatrix} s_{t1} \\ s_{t2} \\ \vdots \\ s_{iM} \end{bmatrix},$$

where each component $$\begin{bmatrix} s_{1i} \\ s_{2i} \\ \vdots \\ s_{Ti} \end{bmatrix} = R \cdot \begin{bmatrix} x_{1i} \\ x_{2i} \\ \vdots \\ x_{Ti} \end{bmatrix}$$

for $t = 1, 2, \ldots, T$, and $i = 1, 2, \ldots, M$.

Then the new transmitting system can be easily described as $$y_t = H_t s_t + n_t, t=1, 2, \ldots, T$$

But the original symbols have been linear-threaded into the new transmitted symbols to achieve higher order diversity. For example, the new 2×2 SMX system with QPSK modulation and T=2 is $$\begin{bmatrix} y_{11} \\ y_{12} \\ y_{21} \\ y_{22} \end{bmatrix} = \begin{bmatrix} h^1_{11} & h^1_{12} & 0 & 0 \\ h^1_{21} & h^1_{22} & 0 & 0 \\ 0 & 0 & h^2_{11} & h^2_{12} \\ 0 & 0 & h^2_{21} & h^2_{22} \end{bmatrix} \cdot \frac{1}{\sqrt{5}} \begin{bmatrix} 2I_2 & I_2 \\ I_2 & -2I_2 \end{bmatrix} \cdot \begin{bmatrix} x_{11} \\ x_{12} \\ x_{21} \\ x_{22} \end{bmatrix} + \begin{bmatrix} n_{11} \\ n_{12} \\ n_{21} \\ n_{22} \end{bmatrix},$$

where the spreading rotation matrix $$R = \frac{1}{\sqrt{5}} \begin{bmatrix} 2 & 1 \\ 1 & -2 \end{bmatrix}$$

is used and $I_2$ is the 2×2 identity matrix.

For the above example, the 4×4 rotation matrix in the formula can be changed to be a unified matrix $$U = \begin{bmatrix} \frac{1}{2} & \frac{1}{2} & 0 & \frac{\sqrt{2}}{2} \\ -\frac{1}{2} & \frac{1}{2} & -\frac{\sqrt{2}}{2} & 0 \\ 0 & \frac{\sqrt{2}}{2} & \frac{1}{2} & -\frac{1}{2} \\ -\frac{\sqrt{2}}{2} & 0 & \frac{1}{2} & \frac{1}{2} \end{bmatrix}$$

which can actually maximizes the minimum product MIMO-symbol distance generalized from the aspect of signal space diversity for single antenna system, as presented in J. Boutros and E. Viterbo, "Signal Space Diversity: A Power- and Bandwidth-Efficient Diversity Technique For The Rayleigh Fading Channel," IEEE Trans. Information Theory, Vol. 44, pp. 453-1467, July 1998. However, both matrices have a simpler computational rotated DFT-matrix, see Wei Zhang; Xiang-Gen Xia; Ching, P. C.; Haiquan Wang; "Rate two full-diversity space-frequency code design for MIMO-OFDM", Signal Processing Advances in Wireless Communications, 2005 IEEE 6th Workshop on Jun. 2-8, 2005 Page(s):303-307 and cosine matrix, see Soo Ki Choi; Seung Young Park; Chung Gu Kang, "Rotated Multidimensional Modulation For Spatial Multiplexing Systems", Vehicular Technology Conference, 2003. VTC 2003-Fall. 2003 IEEE 58th, 6-9 Oct. 2003 Page (s):246-250 Vol. 1.

The spreading rotation matrices can be used here to provide additional diversity for QPSK constellation with T=3 and T=4 and 16QAM with T=2. For example, the new 3×1 SMX system with T=2 and 16QAM will be $$\begin{bmatrix} y_1 \\ y_2 \end{bmatrix} = \begin{bmatrix} h^1_{11} & h^1_{12} & h^1_{13} & 0 & 0 & 0 \\ 0 & 0 & 0 & h^2_{11} & h^2_{12} & h^2_{13} \end{bmatrix}.$$

$$\frac{1}{\sqrt{17}} \begin{bmatrix} 4I_3 & I_3 \\ I_3 & -4I_3 \end{bmatrix} \cdot \begin{bmatrix} x_{11} \\ x_{12} \\ x_{13} \\ x_{21} \\ x_{22} \\ x_{23} \end{bmatrix} + \begin{bmatrix} n_{11} \\ n_{12} \\ n_{13} \\ n_{21} \\ n_{22} \\ n_{23} \end{bmatrix},$$

where a 3×3 spreading rotation matrix is used $$R = \frac{1}{\sqrt{17}} \begin{bmatrix} 4 & 1 \\ 1 & -4 \end{bmatrix}$$

and a $I_3$ is the 3×3 identity matrix.

The diversity order for this new SMX scheme is T×N. FIG. 1 compares the bit error rate performance of an uncoded SMX system with an SMX system according to a preferred embodiment with symbol spreading (T=2) for two transmit and two receive antennas. For QPSK mapping, the performance of the present invention is greatly enhanced compared to the conventional SMX system at high SNR. At the BER of 1-4, there is almost 6 dB gain using the signal spreading of the present invention over the conventional SMX scheme. At the same spectral efficiency of 4 bits/sec/Hz, a preferred embodiment of the present invention is approximately 2 dB better than a 16-QAM Alamouti scheme at the BER of 1e-5, also shown in FIG. 1.

Maximum-likelihood (ML) detection complexity increases exponentially with the diversity order T. In a preferred embodiment, sphere decoding is used in order to reduce the computational load of the ML detection, since sphere decoding can achieve near maximum likelihood (ML) performance at the polynomial complexity with T. Sphere decoding is possible because the present invention is essentially a lattice-based code. Sphere decoding performs a close-point search only over lattice points lying in a certain hyper-sphere centered on a received vector. For a discussion of sphere decoding see, e.g., H. Vikalo and B. Hassibi, "Maximum-Likelihood Sequence Detection of Multiple Antenna Systems over dispersive Channels via Sphere Decoding," EUROSIP Jour. Appl. Sig. Proc 2002:5, pp. 525-531.

Because of the orthogonal structure for spreading rotation matrix R, the MMSE receiver can be easily derived as T individual MMSE demappers or ZF demappers for each channel followed finally by the joint linear combination with R. For example, the MMSE demapper for above 2×2 SMX system with symbol spreading can be derived as $$\begin{bmatrix} \hat{x}_1 \\ \hat{x}_2 \end{bmatrix}_{MMSE} = \frac{1}{\sqrt{5}} \begin{bmatrix} 2I_2 & I_2 \\ I_2 & -2I_2 \end{bmatrix} \cdot \left( \begin{bmatrix} H_1^h H_1 & 0 \\ 0 & H_2^h H_2 \end{bmatrix} + \sigma^2 I_4 \right)^{-1}$$

$$\begin{bmatrix} H_1^h & 0 \\ 0 & H_2^h \end{bmatrix} \begin{bmatrix} y_1 \\ y_2 \end{bmatrix}$$

$$= \frac{1}{\sqrt{5}} \begin{bmatrix} 2I_2 & I_2 \\ I_2 & -2I_2 \end{bmatrix} \begin{bmatrix} (H_1^h H_1 + \sigma^2 I_2)^{-1} H_1^h \cdot y_1 \\ (H_2^h H_2 + \sigma^2 I_2)^{-1} H_2^h \cdot y_2 \end{bmatrix}$$

Similarly, the ZF demapper for the same system can be derived as $$\begin{bmatrix} \hat{x}_1 \\ \hat{x}_2 \end{bmatrix}_{ZF} = \frac{1}{\sqrt{5}} \begin{bmatrix} 2I_2 & I_2 \\ I_2 & -2I_2 \end{bmatrix} \begin{bmatrix} (H_1^h H_1)^{-1} H_1^h \cdot y_1 \\ (H_2^h H_2)^{-1} H_2^h \cdot y_2 \end{bmatrix}$$

Figure 2:
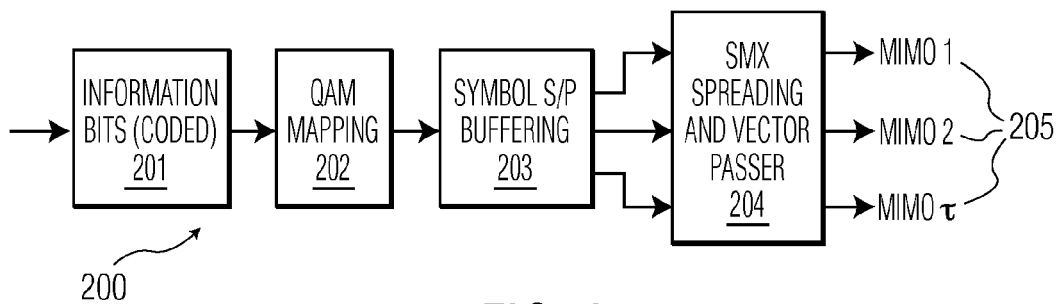
FIG. 2 illustrates the method according to the present invention.
Figure 3:
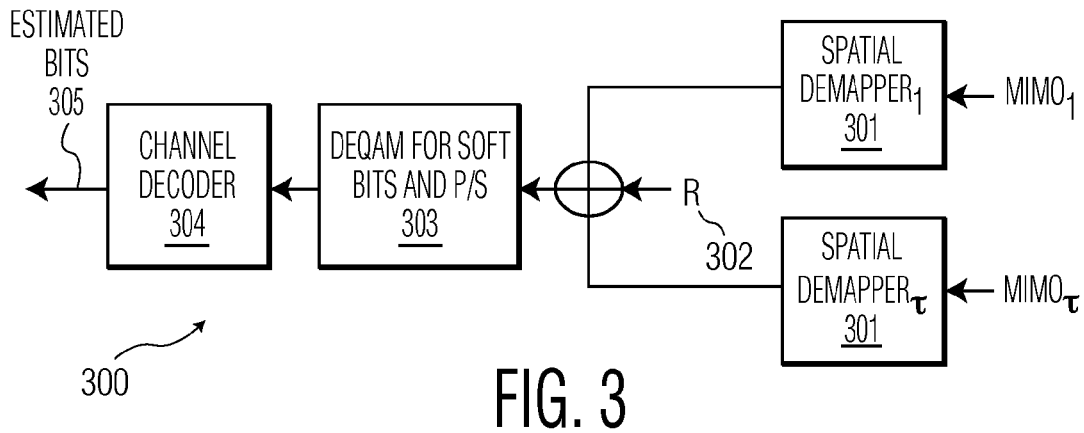
FIG. 3 illustrates an MMSE receiver as T individual MMSE demappers for each channel followed by a joint linear combination.
Figure 4:
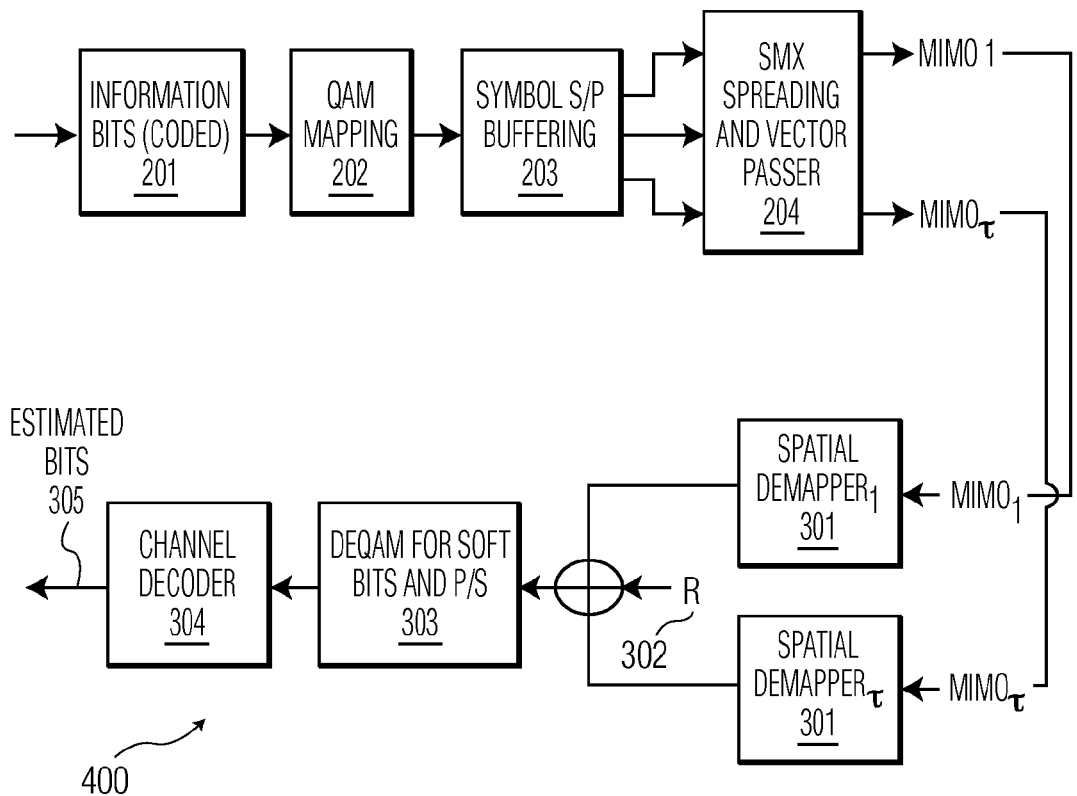
FIG. 4 illustrates a system architecture including the receiver of FIG. 3.

It will have some performance loss due to the property of sub-optimality of MMSE and ZF receivers compared with ML receivers. It can be seen this scheme doesn't increase the decoding complexity of MMSE or ZF receivers. FIG. 3 illustrates a receiver having T individual MMSE spatial demappers 301 that receive T blocks over T different MIMO channels 205 and combines the output of the T individual MMSE spatial demappers 301 with R 302 in a joint linear combination which is decoded by a channel decoder 304 and output as estimated bits 305. FIG. 4 illustrates combining the transmitter 200 of FIG. 2 and the receiver 300 of FIG. 3 in a transceiver system 400 for increasing the diversity of an SMX communication system.

To use the preferred embodiment of the SMX scheme with symbol spreading, one performs the steps of buffering 203 of the mapped QAM symbol vectors 202 of the coded input information bits 201 until T blocks have been received and then multiplying each of them with spreading matrix 204 and finally transmitting the output symbol vectors therefrom over different T independent MIMO channels 205. A flow chart of this method is illustrated in FIG. 2.

A preferred embodiment of the present invention enables prior art SMX systems to achieve high diversity while maintaining the same transmission rate. One of the immediate applications of the present invention is the next generation (Gigabit) Multi-Band (MB) OFDM UWB system. A preferred embodiment of the present invention enables a 1 Gbps mode that has longer range compared to prior art systems. A preferred embodiment of the present invention can also be used for fast flat fading channels as a coding scheme over multiple blocks.

While the preferred embodiments of the present invention have been illustrated and described, it will be understood by those skilled in the art that the system, apparatus and methods as described herein are illustrative and various changes and modifications may be made and equivalents may be substituted for elements thereof without departing from the true scope of the present invention. In addition, many modifications may be made to adapt the teachings of the present invention to a particular situation without departing from its central scope. Therefore, it is intended that the present invention not be limited to the particular embodiments disclosed as the best mode contemplated for carrying out the present invention, but that the present invention include all embodiments falling within the scope of the claim appended hereto.

We claim:

1. A system for a spatial multiplexing (SMX) communication system having a diversity, comprising:
    a receiver device to receive and decode T spread symbol vectors received over T different independent channels; and
    a transmitter device to spread T symbol vectors using a T×T spreading integer rotation matrix R to spread and rotate the T symbol vectors and then transmit the T spread vectors over T different independent channels,
    wherein the diversity for the SMX communication system is increased and at least one of spectral efficiency and power consumption of the communication system is maintained.

2. The system of claim 1, wherein the SMX communication system is a multi-band orthogonal frequency division multiplexing ultra wide band (MB OFDM UWB) system.

3. The system of claim 1, wherein the T different independent channels are multiple in multiple out (MIMO) channels.

4. The system of claim 1, wherein the T different independent channels are fast flat fading channels.

5. The system of claim 1, wherein the transmitter further comprises:
    a buffering module to receive mapped symbols and then accumulate and output T blocks of symbol vectors, each said mapped symbol comprising coded information bits; and
    a spreader module to spread each block, said spreader module being coupled to the buffering module to receive the accumulated T blocks output by the buffer module and to multiply each block by a pre-specified T×T spreading integer rotation matrix R.

6. The system of claim 1, wherein the receiver device further comprises N≧1 receive antennas; and
    the transmitter device further comprises M≧1 transmit antennas, wherein the diversity order of the communication system is increased to T×N.

7. The system of claim 6, wherein the receiver device further comprises:
    T individual demappers for each channel jointly linearly combined with the spreading integer rotation matrix R to create a combined output; and
    a channel decoder to receive and decode the combined output.

8. The system of claim 7, wherein the demappers are all selected from maximum mean square error (MMSE) spatial demapper and ZF demapper.

9. The system of claim 7, wherein the decoder is a sphere decoder.

10. The system of claim 7, wherein the transmitter further comprises:
    a buffering module to receive mapped symbols and then accumulate and output T blocks of symbol vectors, each said mapped symbol comprising coded information bits; and
    a spreader module to spread each block, said spreader module being coupled to the buffering module to receive the accumulated T blocks output by the buffer module and to multiply each block by the spreading integer rotation matrix R.

11. The system of claim 10, wherein the SMX communication system is a multi-band orthogonal frequency division multiplexing ultra wide band (MB OFDM UWB) system.

12. The system of claim 10, wherein the T different independent channels are multiple in multiple out (MIMO) channels.

13. The system of claim 10, wherein the T different independent channels are fast flat fading channels.

14. A method for increasing diversity of a spatial multiplexing (SMX) communication system, comprising:
    spreading and rotating T blocks of mapped symbol vectors that include coded information bits by multiplication of each block by a pre-specified T×T spreading integer rotation matrix R; and
    transmitting the T spread and rotated vectors over T different independent channels, by a transmitter of the SMX communication system,
    wherein, the diversity for the SMX communication system is increased and both spectral efficiency and power consumption of the communication system are maintained.

15. The method of claim 14, wherein the SMX communication system is a multi-band orthogonal frequency division multiplexing ultra wide band (MB OFDM UWB) system.

16. The method of claim 14, wherein the T different independent channels are multiple in multiple out (MIMO) channels.

17. The method of claim 14, wherein the T different independent channels are fast flat fading channels.

18. The method of claim 14, further comprising:
    providing N≧1 receive antennas and M≧1 transmit antennas such that the diversity order of the SMX communication system is increased to T×N.

19. The method of claim 14, further comprising:
    providing T individual demappers, one for each channel, that are jointly linearly combined with the spreading integer rotation matrix R to create a combined demapped output from T signals received over the T channels;
    demapping and combining T received spread and rotated signals with the provided jointly combined T individual demappers to produce a demapped despread and derotated signal; and
    decoding the demapped despread and derotated signal with decoder.

20. The method of claim 19, wherein the decoder is a sphere decoder.

21. The method of claim 19, wherein the demappers are all one type of device selected from the group consisting of maximum mean square error (MMSE) spatial demapper and ZF demapper.

22. A transmitter for a spatial multiplexing (SMX) communication system having a diversity, comprising:

spreader to spread and rotate T symbol vectors using a T×T spreading integer rotation matrix R to spread and rotate the T symbol vectors;

a vector parser to allocate the T spread and rotated vectors over T different independent channels for transmission there over, wherein, the diversity for the SMX communication system is increased and at least one of spectral efficiency and power consumption of the communication system is maintained.

23. The transmitter of claim 22, wherein the SMX communication system is a multi-band orthogonal frequency division multiplexing ultra wide band (MB OFDM UWB) system.

24. The transmitter of claim 22, wherein the T different independent channels are multiple in multiple out (MIMO) channels.

25. The transmitter of claim 22, wherein the T different independent channels are fast flat fading channels.

26. The transmitter of claim 22, further comprising:

a buffering module to receive mapped symbols and then accumulate and output T blocks of symbol vectors, each said mapped symbol comprising coded information bits; and a spreader module to spread and rotate each block, said spreader module being coupled to the buffering module to receive the accumulated T blocks output by the buffer module and to multiply each block by a pre-specified T×T spreading integer rotation matrix R.

27. The transmitter of claim 22, wherein the transmitter device further comprises M≧1 transmit antennas and uses a T×T spreading integer rotation matrix R to spread and rotate the T symbol vectors such that the diversity order of the communication system is increased to T×N where N is a number of receive antennas of a receiver that receives the spread and rotated T symbols transmitted by the transmitter over the T channels.

28. A receiver for receiving T≧1 spread and rotated signals of a spatial multiplexing (SMX) communication system having a diversity, comprising:

T individual spatial demappers to demap T symbol vectors that have been spread and rotated by a T×T spreading integer rotation matrix R and received over T different independent channels received by N≧1 receive antennas;

a combiner to receive from the T individual spatial demappers and jointly and linearly combine, T demapped symbol vectors; and a decoder to receive and decode the combined output, wherein, the diversity for the SMX communication system is increased and at least one of spectral efficiency and power consumption of the communication system is maintained.

29. The receiver of claim 28, wherein the demappers are all one type of device selected from the group consisting of maximum mean square error (MMSE) spatial demapper and ZF demapper.

30. The receiver of claim 29, wherein the decoder is a sphere decoder.

31. The receiver of claim 30, wherein the SMX communication system is a multi-band orthogonal frequency division multiplexing ultra wide band (MB OFDM UWB) system.

32. The receiver of claim 30, wherein the T different independent channels are multiple in multiple out (MIMO) channels.

33. The receiver of claim 30, wherein the T different independent channels are fast flat fading channels.

34. The receiver of claim 30, wherein the diversity order of the SMX communication system is increased to T×N.

* * * * *